(12) United States Patent
Cai et al.

(10) Patent No.: US 11,399,582 B2
(45) Date of Patent: Aug. 2, 2022

(54) GLOVE STRUCTURE

(71) Applicant: SHANGHAI JIN FENG YU GLOVE CO., LTD., Shanghai (CN)

(72) Inventors: Wenlan Cai, Shanghai (CN); Zhibin Li, Shanghai (CN); Jinfeng Li, Shanghai (CN)

(73) Assignee: Shanghai Jin Feng Yu Glove Co., Ltd., Shanghai (CN)

( * ) Notice: Subject to any disclaimer, the term of this patent is extended or adjusted under 35 U.S.C. 154(b) by 274 days.

(21) Appl. No.: 16/476,178

(22) PCT Filed: Jan. 9, 2018

(86) PCT No.: PCT/CN2018/071895
§ 371 (c)(1),
(2) Date: Jul. 5, 2019

(87) PCT Pub. No.: WO2018/130138
PCT Pub. Date: Jul. 19, 2018

(65) Prior Publication Data
US 2019/0343200 A1    Nov. 14, 2019

(30) Foreign Application Priority Data

Jan. 12, 2017   (CN) .......................... 201710020727.X (51) Int. Cl.
*A41D 19/00* (2006.01)
*A41D 19/02* (2006.01)

(52) U.S. Cl.
CPC ..... *A41D 19/0082* (2013.01); *A41D 19/0058* (2013.01); *A41D 19/02* (2013.01)

(58) Field of Classification Search
CPC ............ A41D 19/0082; A41D 19/0058; A41D 19/02; A41D 19/01558; B29C 45/14
See application file for complete search history.

(56) References Cited

U.S. PATENT DOCUMENTS

2009/0070916 A1* 3/2009 Kassam ........... A41D 19/01505
2/158
2018/0035733 A1* 2/2018 Waxter ............. A41D 19/01558

FOREIGN PATENT DOCUMENTS

CN          101406331 A  *  4/2009  ......... B29C 66/1122

* cited by examiner

*Primary Examiner* — Khoa D Huynh
*Assistant Examiner* — Erick I Lopez
(74) *Attorney, Agent, or Firm* — Rosenberg, Klein & Lee (57) ABSTRACT

In the present disclosure, a piece is disposed on a glove core of a glove structure, and an edge of the piece is to injected and filled with molding material to have an injection molding assembly thereon. The injection molding assembly at least fills a section gap between the glove core and the edge of the piece. By using the injection molding assembly, the section gap between the glove core and the edge of the piece is masked, and an adhesive effect for bonding the piece is also obtained. Thus, the present disclosure provides positive and reliable means for preventing the edge of the piece from being separated from the glove core, making the glove structure maintain its required function in long term, increasing the quality and the lifetime of the glove structure, and making the glove structure have a curved surface shape to present its three-dimensional shape.

15 Claims, 8 Drawing Sheets

GLOVE STRUCTURE

FIELD OF THE INVENTION

The present disclosure relates to functional construction of a glove structure, and mainly to a glove structure which can maintain its required function in long term.

BACKGROUND OF THE INVENTION

Humans rely on glove structures as well as clothing, pants, shoes, socks and caps, since the glove structures not only relates to reasons of sociality, but also have meanings of cultures, religions and societies associated with specific colors and styles. Of course, the humans further already understand they can wear the glove structures on specific body portions to prevent bad weathers or environments from damaging the weak human bodies.

To reserve original motion abilities of the human body portions, glove cores of the general glove structures mostly have characteristics of flexibility, and the material is changed to plant from animal skin, then to modern synthetic leather and chemical fiber. Even, the glove cores are disposed with a plurality of different functional construction, and thus when the humans work for some potentially harmful activities, the glove structures can increase safety protection levels, or achieve objectives of decoration or alarming.

The implementation of the functional construction of the glove structure in usual is to dispose a piece with at least one function on the glove core. Depending on different requirements, the material of the piece can be identical to or different from that of the glove core. Depending on the characteristic of piece, the piece is bound to the glove core via a stitching manner or an adhesive manner. The glove core can have a palm portion and finger portions, the palm portion can have a palm piece, a palm side piece and a palm back piece, and each of the finger portions can have a finger piece, a finger side piece and a finger back piece.

For example, CN patent numbered CN 103415223B has disclosed a glove, and contents of the CN patent are included in the present disclosure. To make a non-injection molding assembly (i.e. piece) bound to a lining (i.e. glove core), paragraph [0036] of the CN patent discloses the non-injection molding assembly is adhered to the lining via an injection molding assembly to form a three-layer structure. However, this causes the injection molding assembly to need an area similar to that of the non-injection molding assembly for adhesion, and a weight and a thickness of the glove are thus increased due to the design of the three-layer structure. Further, such design further causes the overall hand operation to be not dexterous after wearing the glove. Moreover, the region covered by the non-injection molding assembly is airtight, and this causes the user to feel that his/her hands are uncomfortable and muggy. For example, when the non-injection molding assembly is needed to have high breathability and high wear resistance, the breathability of the non-injection molding assembly will be deceased or even lost if the design of the three-layer structure in the above CN patent is adopted for manufacturing the glove, i.e. the design of the three-layer structure in the above CN patent makes non-injection molding assembly lose its original function.

However, regardless the stitching or adhesive manner for making the piece bound to the surface of the glove core, an edge of the piece and the glove core form a section gap which is touched by an external force or object easily. Once the edge of the piece is separated from the glove core, a leak that easily leads to the large-area peeling of the piece is easily formed, and the design above three-layer structure causes the section gap to become larger. The larger section gap is touched by an external force or object more easily to make the piece separated from the glove core, the glove structure thus cannot maintain the required function in long term, and the usage lifetime of the glove structure is seriously affected.

SUMMARY OF THE INVENTION

According to one of objectives of the present disclosure, the present disclosure provides a glove structure which can maintain its required function in long term, and further provides a glove using the glove structure.

The glove structure of the present disclosure at least comprises a glove core a piece, wherein a bottom surface of the piece covers an outer surface of the glove core, and the glove structure is characterized in, the outer surface is configured to have an injection molding assembly and the injection molding assembly fills a section of the piece.

By using the above structure characteristic, the glove structure of the present disclosure can have a shielding effect due to a section gap formed between the injection molding assembly and the piece and the glove core, and at the same time, it produces the fixing effect for bonding the piece, therefore providing positive and reliable means for preventing the edge of the piece from being separated from the glove core, making the glove structure maintain its required function in long term and increasing the quality of the glove structure. Further, by filling the section of the piece with the injection molding assembly, the original function of the piece will not be affected, i.e. the injection molding assembly of the glove structure in the present disclosure will not make the piece lose its original function.

According to the above features, the injection molding assembly extends to a top surface of the piece to form an injection mold overlapping section, and the injection mold overlapping section fills at least one portion of the top surface.

According to the above features, the injection mold overlapping section merely fills a top surface edge of the top surface. By using injection mold overlapping section and the injection molding assembly on the side of the section, a fastener structure is formed for bonding the piece, and the top surface edge is located in a region which the top surface is far away from the section within 10 milli meters.

According to the above features, the outer surface and the section forms an angle on the injection molding assembly, and the angle is a right angle.

According to the above features, the outer surface and the section forms an angle on the injection molding assembly, and the angle is an obtuse angle. The section has a beveled shape, and a contacting area between the section and the injection molding assembly is larger than that when the angle is the right angle.

According to the above features, the outer surface and the section forms an angle on the injection molding assembly, and the angle is a sharp angle. The section has a beveled shape, and a contacting area between the section and the injection molding assembly is larger than that when the angle is the right angle. Further, an injection mold holding section is formed, and by using the injection mold holding section, the injection molding assembly and the injection mold overlapping section, a clamping effect for the piece is obtained.

According to the above features, the bottom surface of the piece is configured to have a bonding layer.

According to the above features, the bonding layer is merely disposed on a bottom surface edge of the bottom surface, and the bottom surface edge is located in a region which bottom surface is far away from the section within 10 milli meters.

According to the above features, the injection molding assembly extends underneath the bottom surface to form an injection mold clamping section.

According to the above features, the injection mold clamping section is adhered to the bottom surface.

According to the above features, the injection mold clamping section is adhered to a bonding bottom surface of the bonding layer.

According to the above features, the injection mold clamping section, the injection molding assembly and the injection mold overlapping section are formed for clamping and bonding the piece.

According to the above features, the piece and the injection molding assembly cover more than 50% of a perimeter of a glove core section of the glove core, such that a strain force of the piece and the injection molding assembly is converted to a bonding force for enhance the adhesions of "the glove core and the piece" and "the glove core and the injection molding assembly".

According to the above features, the piece covers more than 50% of the perimeter of the glove core section.

According to the above features, the injection molding assembly extends to another side of the piece to form an injection mold function section, such that functions of the injection molding assembly and the piece are complementary to each other.

According to the above features, the injection molding assembly has a curved surface shape to cover any one portion of the glove core.

According to the above features, the glove core has a palm piece, a palm side piece and a palm back piece, and the curved surface shape covers the palm side piece.

According to the above features, the glove core has a finger piece, a finger side piece and a finger back piece, and the curved surface shape covers the finger side piece.

According to the above features, the curved surface shape covers "the palm side piece and the palm piece" or "the palm side piece and the palm back piece".

According to the above features, the curved surface shape covers "the finger side piece and the finger piece" or "the finger side piece and the finger back piece".

According to the above features, the curved surface shape covers the palm back piece, the palm side piece and the palm piece.

According to the above features, the curved surface shape covers the finger back piece, the finger side piece and the finger piece.

The present disclosure utilizes the injection molding assembly to mask the section gap between the piece and the glove core, and at the same time, the piece is thus bound to the glove core. Therefore, the present disclosure provides positive and reliable means for preventing the edge of the piece from being separated from the glove core, making the glove structure maintain its required function in long term and increasing the quality of the glove structure. Especially, the injection molding assembly, the piece and the glove core of the glove structure with different functions can be stably bound to each other, the function characteristic of the glove structure is enhanced, and the lifetime of the glove structure is dramatically increased.

DESCRIPTION OF THE PREFERRED EMBODIMENTS

Figure 1:
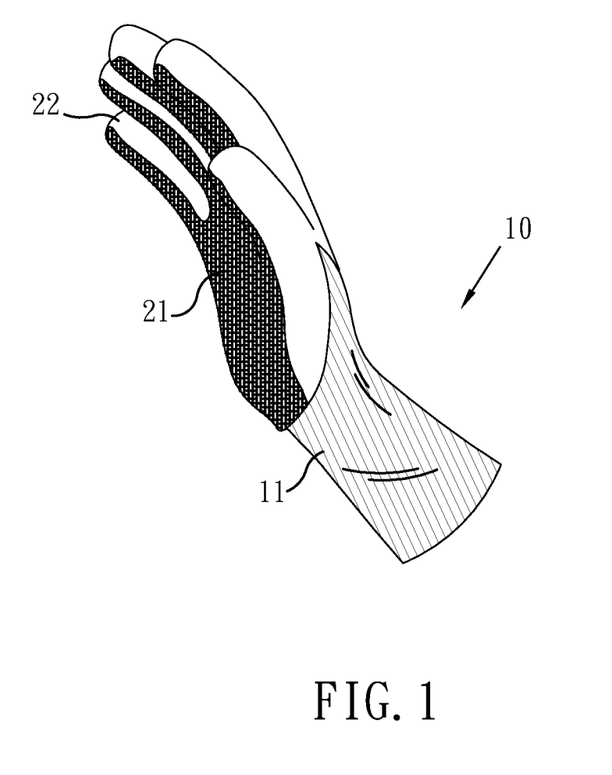
FIG. 1 is a schematic diagram showing a usage configuration of a glove structure of the present disclosure.
Figure 2:
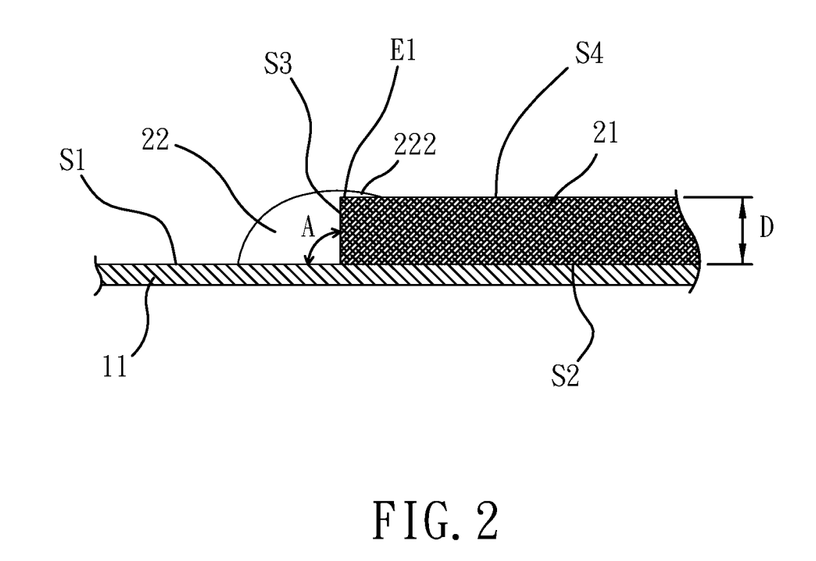
FIG. 2 is a section view of a partial structure of the glove structure according to the first embodiment of the present disclosure.

The present disclosure mainly provides a glove structure. As shown in FIG. 1 and FIG. 2, a glove core 11 of a glove structure 10 is covered by at least a piece 21, and via the piece 21, the glove structure 10 has a predetermined functional characteristic, such as non-slip, scratch-resistant, waterproof, thermal insulated or electricity insulated characteristic.

In the embodiment of the present disclosure, the glove core 11 of the glove structure 10 can be made of cotton yarn, leather, plush, fiber, natural fiber, rayon, non-woven fabric, plastic or rubber, the glove core 11 can be a knitted glove, a sewing glove or a woven glove, and the material of the piece 21 can be the same as that of the glove core 11. Or alternatively, the material of the piece 21 can be different from that of the glove core 11. The glove core 11 can comprise a palm portion and a finger portion, and the palm portion can comprise a palm piece, a palm side piece and a palm back piece while the finger portion can comprise a finger piece, a finger side piece and a finger back piece. Or alternatively, the glove core 11 can merely have the palm portion, and the finger portion is not an essential component of the glove core 11; or the glove core 11 can merely have the finger portion, and the palm portion is not an essential component of the glove core 11. It is noted that the palm portion, the finger portion, the palm piece, the palm side piece, the palm back piece, the finger piece, the finger side piece and the finger back piece are well known by the person with the ordinary skill in the art, and thus omitting the reference numbers of them.

Regarding the glove structure of the present disclosure, a bottom surface S2 of the piece 21 is configured to cover an outer surface S1 of the glove core 11, and the glove structure is characterized in: the outer surface S1 has an injection molding assembly 22 which fills a section S3 of the piece 21.

Generally speaking, the piece 21 is pre-cut to have a specific outline, a molding tool is next used to make the piece 21 cover and located on a preset position of the glove core 11, and melted injection molding material fills the outer surface S1 of the glove core 11 and the section S3 of the piece 21 via the molding tool. After the melted injection molding material is cooled down and shaped, the injection molding assembly 22 which fills a section gap D between the glove core 11 and the piece 21 is formed.

Accordingly, regarding the glove structure of the present disclosure, the injection molding assembly 22 can mask section gap D between the glove core 11 and the piece 21, and at the same time, the melted injection molding material is liquid to permeate into the outer surface S1 and the section S3 via the high pressure of the molding tool. The melted injection molding material thus flows to inner pores of the outer surface S1 and the section S3 for generating high adhesion of molecule winding of physical phenomenon or even a high bonding force of chemical bonding. Thus, even under the condition that the outer surface S1 of the glove core 11 and bottom surface S2 of the piece 21 have a little adhesive force or no boding force, the piece 21 (i.e. the bottom surface S2) can be bound to the glove core 11 (i.e. the outer surface S1) since the injection molding assembly 22 of the outer surface S1 fills the section S3.

Furthermore, the injection molding material is usually elastic material, and thus when an external force is applied on the injection molding assembly 22 with the intend to separate the glove core 11 and the piece 21 from the section gap D, the buffering characteristic of the elastic material resists again most of the external force, the probability of separating the glove core 11 and the piece 21 from the section gap D is dramatically decreased, and the lifetime of the glove structure 10 is increased. The present disclosure merely uses little injection molding assembly 22 of the outer surface S1 to fill the section S3 of the piece 21 to achieve the objective of bonding the piece 21 (i.e. the bottom surface S2) to the glove core 11 (i.e. the outer surface S1), and the thickness of the whole glove structure 10 is maintained to a thickness summation of the thickness of glove core 11 and the thickness of the piece 21, without the heavy and thick disadvantages due to three-layer structure mentioned in the prior art. Since the injection molding assembly 22 is little and small, it occupies less area of the piece 21, and the original breathability if the piece 21 is not affected by the injection molding assembly 22. At the same time, by using the buffering characteristic of the injection molding assembly 22, the damage of the external force can be eliminated, and thus the lifetime of the glove structure 10 is increased. To sum up, the present disclosure provides positive and reliable means for preventing the piece 21 from being separated from the glove core 11 via the section gap D, making the glove structure maintain its required function in long term, and increasing the quality and the lifetime of the glove structure.

Moreover, the injection molding assembly 22 extends along the direction of the disposed piece 21 to form an injection mold overlapping section 222, the injection mold overlapping section 222 of the injection molding assembly 22 fills at least one portion of a top surface S4 of the piece 21, and by utilizing the injection mold overlapping section 222, a contacting area between the injection molding assembly 22 and the piece 21 is increased as well as the bonding or adhesive force of the injection molding assembly 22 and the piece 21, thus making the piece 21 is more tightly bound to the glove core 11. The injection mold overlapping section 222 and the injection molding assembly 22 on the side of the section S3 form a fastener structure with a right angle for bonding the piece 21, and thus, not only the bonding of the piece 21 and the injection molding assembly 22 is enhanced, but also the intend of the external force for separating the piece 21 away from the injection molding assembly 22 can be prevented. Especially, when the external force is the force being vertical to the direction of the outer surface S1 for separating the piece 21 away from the injection molding assembly 22, the injection mold overlapping section 222 and the injection molding assembly 22 on the side of the section S3 form a better fastener structure with a right angle for bonding the piece 21, and preferably, the effect for resisting the external force which is intended to separate the piece 21 away from the injection molding assembly 22 is better when the injection mold overlapping section 222 and the injection molding assembly 22 are integrally formed.

The injection mold overlapping section 222 of the injection molding assembly 22 can merely fills a top surface edge E1 of the top surface S4 of the piece 21. Such configuration can make the injection mold overlapping section 222 increases the contacting area between the injection molding assembly 22 and the piece 21 to form the fastener structure with a right angle for bonding the piece 21, and maintain the original breathability of the piece 21 without being affected by the injection molding assembly 22.

Figure 3:
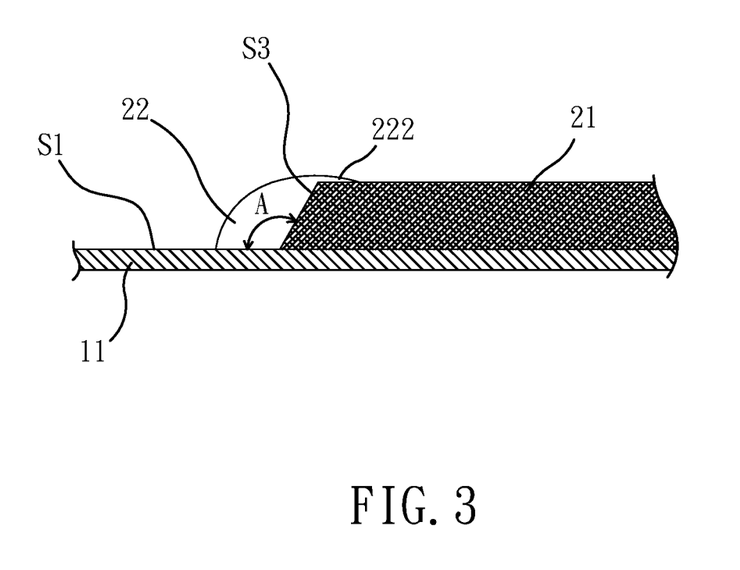
FIG. 3 is a section view of an obtuse angle structure of the glove structure according to the first embodiment of the present disclosure.
Figure 4:
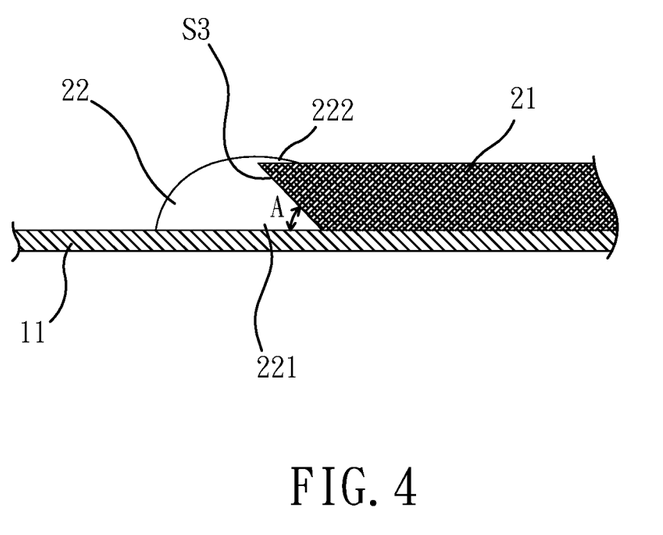
FIG. 4 is a section view of a sharp angle structure of the glove structure according to the first embodiment of the present disclosure.

The outer surface S1 and the section S3 form an angle A on the injection molding assembly 22. In FIG. 2, the angle A is the right angle, i.e. the angle A is 90 degrees; in FIG. 3, when the angle A is an obtuse angle, i.e. the angle A is larger than 90 degrees and less than 180 degrees, the section S3 has a beveled shape to make the contacting area between the section S3 and the injection molding assembly 22 is larger than that when the angle A is the right angle; in FIG. 4, when the angle A is a sharp angle, i.e. the angle A is larger than 0 degrees and less than 90 degrees, the section S3 has a beveled shape, the contacting area between the section S3 and the injection molding assembly 22 is larger than that when the angle A is the right angle, an injection mold holding section 221 is formed, and by using the injection mold holding section 221, the injection molding assembly 22 and the injection mold overlapping section 222, a clamping effect for the piece 21 is obtained. Therefore, in the embodiment of FIG. 4, the boding of the injection molding assembly 22 and the piece 21 is enhanced.

Figure 5:
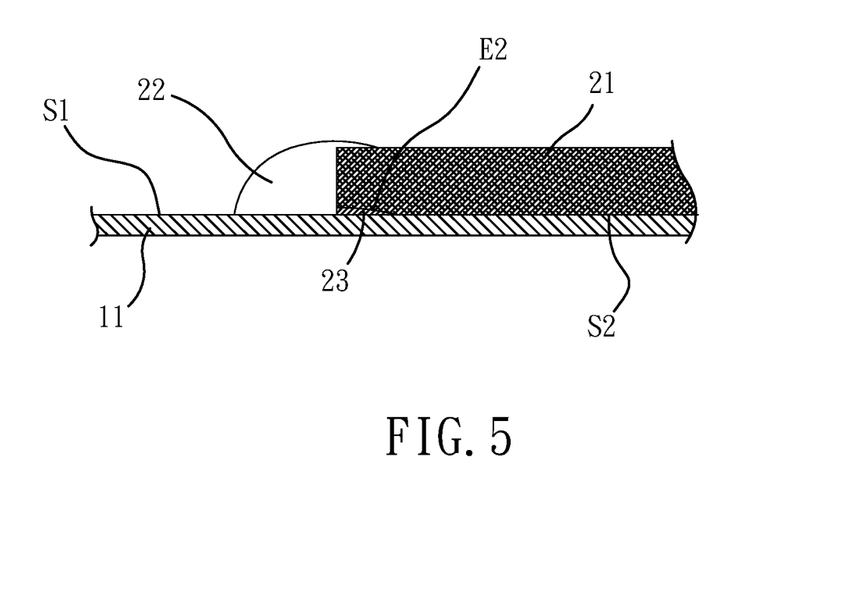
FIG. 5 is a section view of a partial structure of the glove structure according to the second embodiment of the present disclosure.

Referring to FIG. 5, as mentioned above, the molding tool is utilized to make the piece 21 cover and be located on the preset position of the glove core 11, the bottom surface S2 of the piece 21 in the embodiment is configured to have a bonding layer 23. The bonding layer 23 is made of adhesive material to make the bottom surface S2 of the piece 21 adhered to the outer surface S1 of the glove core 11. The bonding layer 23 can merely be disposed on a bottom surface edge E2 of the bottom surface S2 without coating the adhesive material on the whole bottom surface S2, so as to reduce the effect on the original function of the piece 21, such as the breathability. Or alternatively, the bonding layer 23 on the bottom surface S2 can be coated in an discontinuous manner, for example, specific regions of the bottom surface S2 are coated with the adhesive material while other regions of the bottom surface S2 are not coated with the adhesive material, so as to reduce the effect on the original function of the piece 21.

Figure 6:
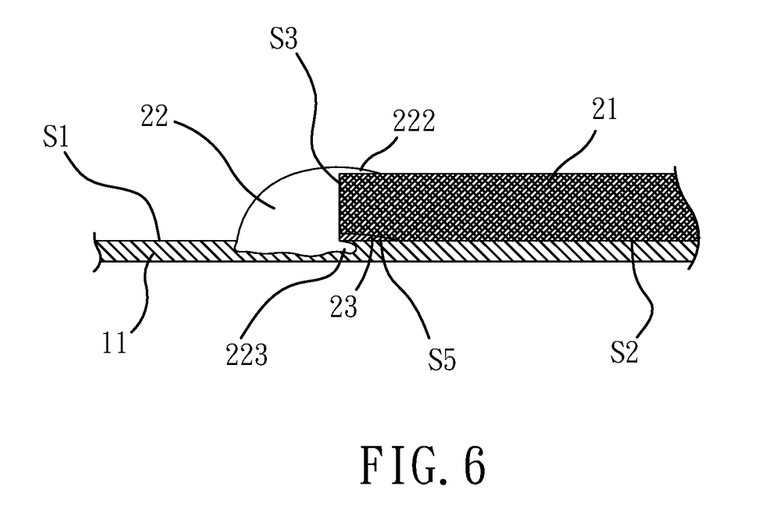
FIG. 6 is a section view of a partial structure of the glove structure according to the third embodiment of the present disclosure.

Referring to FIG. 6, as mentioned above, the molding tool can be utilized to make the melted injection molding material fill the outer surface S1 of the glove core 11 and the section S3 of the piece 21, depending on material characteristics of different material of the glove core 11, the injection molding material of the injection molding assembly 22 permeates into the disposed glove core 11 with a predetermined depth, and the interface boding effect (i.e. anchorage) of the injection molding assembly 22 and the glove core 11 can be achieved, thus increasing the structure strength of the functional construction. The injection molding assembly 22 can permeate into the disposed glove core 11, and then extend underneath the bottom surface S2 of the piece 21 to form an injection mold clamping section 223 which is bound to bottom surface S2 or a bonding bottom surface S5 of the bonding layer 23. The injection mold clamping section 223, the injection molding assembly 22 and the injection mold overlapping section 222 are formed for clamping and bonding the piece 21, so as to enhance the bonding of the injection molding assembly 22 and the piece 21. It is noted that, an unexpected finding shows that since the injection molding material of the injection molding assembly 22 permeates into the disposed glove core 11 with the predetermined depth, after the melted injection molding material is cooled down and shaped, the stiffness of the glove core 11 is unexpectedly increased. According to theory of Young's modulus, the resistance of deformation of the glove core 11 is unexpectedly increased, and at the same time, it is also found that within the applicable range of Hooke's law, the region which the glove core 11 disposed on the injection molding assembly 22 is not slackened after wearing for a long term, maintains its original state as it is not used, and increases the durability and comfort of the whole glove structure.

Figure 7:
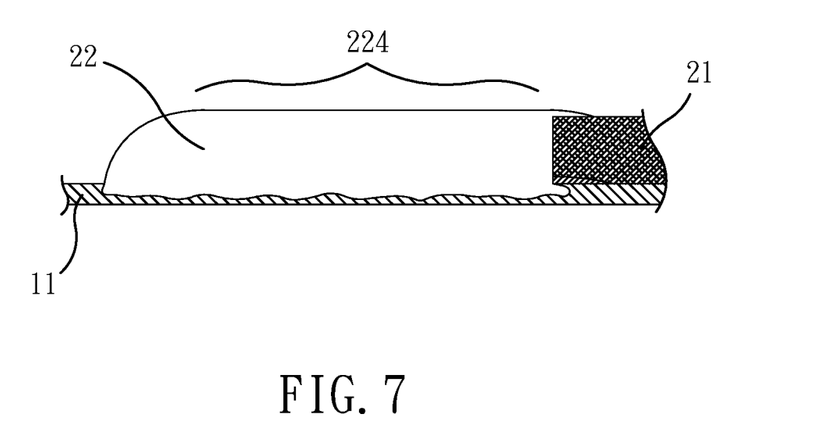
FIG. 7 is a section view of a partial structure of the glove structure according to the fourth embodiment of the present disclosure.

Similarly, as shown in FIG. 7, the injection molding assembly 22 can generate function characteristic different from those of the glove core 11 and the piece 11 depending on the material characteristic of the injection molding assembly 22. The function characteristic of the injection molding assembly 22 can be the non-slip, scratch-resistant, waterproof, heat-insulating or insulating function, for example. Thus, the injection molding assembly 22 extends to another side of the disposed piece 21 to form an injection mold function section 224, and the injection mold function section 224 can have the non-slip, scratch-resistant, waterproof, heat-insulating or insulating function. In the embodiment, functions of the injection molding assembly 22 and the piece 21 are complementary to each other, for example, the good breathability of the piece 21 can be used to enhance the poor breathability of the injection molding assembly 22, and good wear resistance of the injection molding assembly 22 can be used to enhance the poor wear resistance of the piece 21. Or alternatively, the functions of the injection molding assembly 22 and the piece 21 can be multiplication functions, for example, the injection molding assembly 22 is used to fill the section gap between the glove core 11 and the piece 21, thus the probability of separating the glove core 11 and piece 21 from the section gap is decreased, the thickness of the whole glove structure maintains about the thickness summation of the thickness of the glove core 11 and the thickness of the piece 21, and the function of the injection molding assembly 22 is replaced by that of the piece 21. Therefore, the usage amount of the injection molding assembly 22 can be reduced, and the glove structure will not have the thick, poor breathability and heavy disadvantages due to the three-layer structure as mentioned in the prior art.

Specifically, the glove structure of the present disclosure can be widely applied in gloves, clothing, pants, shoes, socks and hats to produce different functions, for example, anti-slip, scratch-resistant, waterproof, heat-insulating, insulating and even reflective, warning and other functions.

Figure 8:
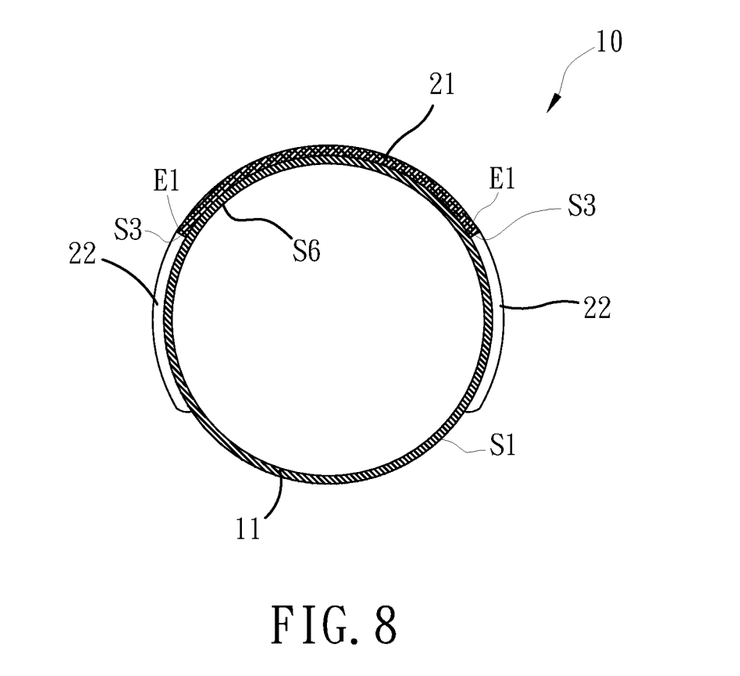
FIG. 8 is a section view of the glove structure of the present disclosure.

Referring to FIG. 8, in the glove structure 10 of the present disclosure, the injection molding assembly 22 which covers the piece 21 of the glove core 11 and fills the glove core 11 covers more than 50% of a perimeter of a glove core section S6 of the glove core 11, or the piece 21 independently covers more than 50% of the perimeter of the glove core section S6. By using the piece 21 and the injection molding assembly 22, the toughness of the glove core 11 is increased, and the protection safety of wearing the glove structure 10 is also increased. When the user wears the glove structure 10 of the present disclosure, a pressure force toward outside is induced to spread the glove core 11 toward outside, as blowing the balloon to make it inflated. The piece 21 adhered to the glove core 11 and the injection molding assembly 22 generate a strain force and a pressure force toward inside, wherein the pressure force toward inside has the direction being opposite to the pressure forces toward outside, and has the force amount same as that of the pressure forces toward outside, so as to resist the pressure forces toward outside to form a balance state. The above design which more than 50% of the perimeter of the glove core section S6 is covered can form a curved surface when the glove structure 10 is worn. As the inflated balloon, an equivalent force of strain forces of portions on the curved surface of the balloon directs to the inside of the curved surface of the balloon, and the direction of the equivalent force directing to the inside of the curved surface of the present disclosure is the same as the adhesive directions of "the glove core 11 and piece 21" and "the glove core 11 and the injection molding assembly 22", i.e. the directions direct to the inner central direction of the glove core section S6. The strain forces of the piece 21 and the injection molding assembly 22 can be used be converted to the forces for enhancing the bonding of "the glove core 11 and piece 21" and "the glove core 11 and the injection molding assembly 22" via the curved surface of wearing the glove structure. Thus, not only the glove structure 10 can obtain the better function characteristic, but also the mechanic structure strength of the whole glove structure 10 is getting better.

As shown in FIG. 8, the piece 21 on the glove core section S6 can have the two section S3, wherein any one of sections S3 is disposed on the palm piece, a interconnection of the palm piece and the palm side piece, the palm side piece, a interconnection of the palm side piece and the palm back piece, the palm back piece, the finger piece, a interconnection of the finger piece and the finger side piece, the finger side piece, a interconnection of the finger side piece and the finger back piece, or the finger back piece of the glove core 11; and another one section S3 extended along the piece 21 is disposed on the palm piece, a interconnection of the palm piece and the palm side piece, the palm side piece, a interconnection of the palm side piece and the palm back piece, the palm back piece, the finger piece, a interconnection of the finger piece and the finger side piece, the finger side piece, a interconnection of the finger side piece and the finger back piece, or the finger back piece of the glove core 11. It is noted that the palm portion, the finger portion, the palm piece, the palm side piece, the palm back piece, the finger piece, the finger side piece and the finger back piece are well known by the person with the ordinary skill in the art, and thus omitting the reference numbers of them.

It is also noted that, another unexpected finding shows that the shaping of the injection molding assembly 22 is to melt the injection molding material to the liquid, make the liquid flow into the space between an inner and outer three-dimensional hand shape molding tools which simulates the human hand shape, and make the liquid permeate into the outer surface S1 and the section S3 by using the high pressure in the molding tools. After the melted injection molding material is cooled down and shaped, as shown in FIG. 8, the injection molding assembly 22 is formed with a curved surface shape. Since the melted injection molding material is cooled down to be shaped, the stiffness of the glove core 11 is unexpectedly increased. According to theory of Young's modulus, the resistance of deformation of the glove core 11 is unexpectedly increased. Thus, even the external force is applied to the curved surface shape, for example, the pressure force generated by stacking the glove structures, when the curved surface shape is under the pressure force or the pressure force is released, within the applicable range of Hooke's law, the curved surface shape restore to its original shape. The formation and maintenance of the curved surface shape unexpectedly makes the glove structure 10 have a three-dimensional structure. The curved surface shape covers any one portion of the glove core to present the three-dimensional structure. Preferably, when the curved surface shape covers the palm side piece or the finger side piece of the glove core 11, the three-dimensional structure is presented. More preferably, when the curved surface shape covers "the palm side piece and the palm piece", "the palm side piece and the palm back piece", "the finger side piece and the finger piece" or "the finger side piece and the finger back piece" of the glove core 11, the three-dimensional structure is presented. Most preferably, when the curved surface shape covers "the palm back piece, the palm side piece and the palm piece" or "the finger back piece, the finger side piece and the finger piece" of the glove core 11, the three-dimensional structure is presented. The curved surface shape of the injection molding assembly 22 unexpectedly makes the top surface edge E1 of the piece 21 bound to the injection molding assembly 22 also be a curved surface shape, and this further makes the glove structure 10 more present the three-dimensional structure.

Compared to the prior art, the present disclosure utilizes the injection molding assembly to mask the section gap between the piece and the glove core, and to achieve the objective of bonding the piece, thus providing positive and reliable means for preventing the piece from being separated from the glove core, making the glove structure maintain its required function in long term, increasing the quality of the glove structure. Especially, the injection molding assembly, the piece and the glove core of the glove structure with different functions can be stably bound to each other, the function characteristic of the glove structure is enhanced, the lifetime of the glove structure is dramatically increased, and the glove structure has a curved surface shape to present its three-dimensional shape.

What is claimed is:

1. A glove structure, at least comprising: a glove core and a piece, wherein a bottom surface of the piece covers an outer surface of the glove core, and the glove structure is characterized in, the outer surface has an injection molding assembly, the injection molding assembly fills a section of the piece, the injection molding assembly extends to a top surface of the piece to form an injection mold overlapping section, only a top surface edge of the top surface is filled by the injection mold overlapping section, the top surface edge is located in a region of the top surface, a distance between the region of the top surface and the section of the piece is less than or equal to 10 millimeters, the bottom surface of the piece has a bonding layer, and the injection molding assembly extends underneath the bottom surface to form an injection mold clamping section.

2. The glove structure according to claim 1, wherein the bonding layer is disposed only on a bottom surface edge of the bottom surface.

3. The glove structure according to claim 2, wherein a distance between the region of the bottom surface and the section of the piece is less than or equal to 10 milli meters.

4. The glove structure according to claim 1, wherein the injection molding assembly extends to another side of the piece to form an injection mold function section.

5. The glove structure according to claim 1, wherein the glove core has a palm piece, a palm side piece, a palm back piece, a finger piece, a finger side piece and a finger back piece; the piece disposed on a glove core section of the glove core has the two sections, wherein one of the two sections of the piece is disposed on the palm piece, a interconnection of the palm piece and the palm side piece, the palm side piece, a interconnection of the palm side piece and the palm back piece, the palm back piece, the finger piece, a interconnection of the finger piece and the finger side piece, the finger side piece, a interconnection of the finger side piece and the finger back piece, or the finger back piece of the glove core; and other one of the two sections of the piece extending along the piece is disposed on the palm piece, a interconnection of the palm piece and the palm side piece, the palm side piece, a interconnection of the palm side piece and the palm back piece, the palm back piece, the finger piece, a interconnection of the finger piece and the finger side piece, the finger side piece, a interconnection of the finger side piece and the finger back piece, or the finger back piece of the glove core.

6. The glove structure according to claim 1, wherein the injection molding assembly has a curved surface shape to cover any one portion of the glove core.

7. The glove structure according to claim 6, wherein the glove core has a palm side piece, and the curved surface shape covers the palm side piece.

8. The glove structure according to claim 6, wherein the glove core has a palm piece, a palm side piece and a palm back piece, and the curved surface shape covers the palm side piece and the palm piece or the palm side piece and the palm back piece.

9. The glove structure according to claim 6, wherein the glove core has a finger piece, a finger side piece and a finger back piece, and the curved surface shape covers the finger side piece and the finger piece or the finger side piece and the finger back piece.

10. The glove structure according to claim 6, wherein the glove core has a palm piece, a palm side piece and a palm back piece, and the curved surface shape covers the palm back piece, the palm side piece and the palm piece.

11. The glove structure according to claim 6, wherein the glove core has a finger piece, a finger side piece and a finger back piece, and the curved surface shape covers the finger back piece, the finger side piece and the finger piece.

12. The glove structure according to claim 1, wherein the injection mold clamping section is adhered to a bonding bottom surface of the bonding layer.

13. The glove structure according to claim 12, wherein the glove core has a palm piece, a palm side piece, a palm back piece, a finger piece, a finger side piece and a finger back piece; the piece disposed on a glove core section of the glove core has the two sections, wherein one of the two sections of the piece is disposed on the palm piece, a interconnection of the palm piece and the palm side piece, the palm side piece, a interconnection of the palm side piece and the palm back piece, the palm back piece, the finger piece, a interconnection of the finger piece and the finger side piece, the finger side piece, a interconnection of the finger side piece and the finger back piece, or the finger back piece of the glove core; and other one of the two sections of the piece extending along the piece is disposed on the palm piece, a interconnection of the palm piece and the palm side piece, the palm side piece, a interconnection of the palm side piece and the palm back piece, the palm back piece, the finger piece, a interconnection of the finger piece and the finger side piece, the finger side piece, a interconnection of the finger side piece and the finger back piece, or the finger back piece of the glove core.

14. The glove structure according to claim 1, wherein the piece and the injection molding assembly cover more than 50% of a perimeter of a glove core section of the glove core.

15. The glove structure according to claim 14, wherein the piece covers more than 50% of the perimeter of the glove core section of the glove core.

\* \* \* \* \*